US008849974B2

(12) United States Patent
Naik et al.

(10) Patent No.: US 8,849,974 B2
(45) Date of Patent: Sep. 30, 2014

(54) SOCIAL NETWORK BASED INFORMATION DISCOVERY ABOUT NETWORK DATA PROCESSING SYSTEMS

(75) Inventors: Vijay K. Naik, Pleasantville, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1117 days.

(21) Appl. No.: 12/759,947

(22) Filed: Apr. 14, 2010

(65) Prior Publication Data
US 2011/0258215 A1 Oct. 20, 2011

(51) Int. Cl.
G06F 15/16 (2006.01)
G06F 15/173 (2006.01)
G06F 15/177 (2006.01)
G06Q 10/06 (2012.01)
H04L 29/08 (2006.01)
G06Q 10/10 (2012.01)

(52) U.S. Cl.
CPC ............... *H04L 67/30* (2013.01); *G06Q 10/06* (2013.01); *G06Q 10/10* (2013.01)
USPC ........... 709/223; 709/204; 709/205; 709/206; 709/207; 709/220; 709/222; 709/224; 709/230

(58) Field of Classification Search
USPC ......... 709/220–222, 223, 224, 230, 204, 205, 709/206, 207
See application file for complete search history.

(56) References Cited

U.S. PATENT DOCUMENTS

| | | | |
|---|---|---|---|
| 6,092,109 A * | 7/2000 | Goto et al. | 709/224 |
| 7,315,801 B1 * | 1/2008 | Dowd et al. | 703/13 |
| 7,370,022 B2 | 5/2008 | Gupta et al. | |
| 7,467,383 B2 | 12/2008 | Inchingolo et al. | |
| 7,546,295 B2 | 6/2009 | Brave et al. | |
| 7,668,541 B2 | 2/2010 | O'Neill et al. | |
| 8,001,074 B2 | 8/2011 | To | |
| 8,005,812 B1 | 8/2011 | Mosterman et al. | |
| 8,027,938 B1 | 9/2011 | Xu et al. | |
| 8,122,253 B2 * | 2/2012 | Garg et al. | 713/170 |
| 2002/0029272 A1 | 3/2002 | Weller | |
| 2002/0116210 A1 | 8/2002 | Medina et al. | |
| 2003/0154403 A1 * | 8/2003 | Keinsley et al. | 713/201 |
| 2003/0212779 A1 * | 11/2003 | Boyter et al. | 709/223 |

(Continued)

OTHER PUBLICATIONS

Office Action dated May 17, 2013 regarding USPTO U.S. Appl. No. 12/755,611, 46 pages.

(Continued)

*Primary Examiner* — Edward Kim
(74) *Attorney, Agent, or Firm* — Yee & Associates, P.C.; Louis J. Percello

(57) ABSTRACT

According to one embodiment of the present invention, a method is present for analyzing a network data processing system. Known information about the network data processing system is obtained by a computer system. A model of the network data processing system is created by the computer system using the known information. Missing information about the network data processing system is identified by the computer system in the model of the network data processing system. A number of people is selected by the computer system for obtaining the missing information. A number of requests to the number of people is sent by the computer system for the missing information. Each request includes the model. In response to receiving a number of responses to the number of requests by the computer system, the computer system updates the model.

23 Claims, 12 Drawing Sheets

(56) References Cited

U.S. PATENT DOCUMENTS

| | | | |
|---|---|---|---|
| 2004/0017400 A1 | 1/2004 | Ly et al. | |
| 2005/0086340 A1* | 4/2005 | Kang et al. | 709/224 |
| 2005/0210133 A1* | 9/2005 | Florissi et al. | 709/224 |
| 2005/0210473 A1 | 9/2005 | Inchingolo et al. | |
| 2005/0216295 A1 | 9/2005 | Abrahamsohn | |
| 2007/0022142 A1 | 1/2007 | Palmer et al. | |
| 2007/0136788 A1* | 6/2007 | Monahan et al. | 726/3 |
| 2007/0150465 A1 | 6/2007 | Brave et al. | |
| 2007/0156883 A1* | 7/2007 | Thompson et al. | 709/223 |
| 2008/0052298 A1 | 2/2008 | Yeh | |
| 2008/0082389 A1 | 4/2008 | Gura | |
| 2008/0275910 A1 | 11/2008 | Molina-Moreno et al. | |
| 2009/0125623 A1* | 5/2009 | Garg et al. | 709/224 |
| 2009/0198487 A1 | 8/2009 | Wong et al. | |
| 2010/0174579 A1 | 7/2010 | Hughes | |
| 2010/0332281 A1 | 12/2010 | Horvitz et al. | |
| 2011/0029349 A1 | 2/2011 | Omiya | |
| 2011/0138028 A1* | 6/2011 | Katz et al. | 709/223 |
| 2011/0252382 A1 | 10/2011 | Bhaskaran et al. | |
| 2011/0282706 A1 | 11/2011 | Ezra et al. | |

OTHER PUBLICATIONS

"What is TopCoder?," TopCoder, Inc., dated Feb. 8, 2010, 2 pages. Accessed Mar. 20, 2013, http://web.archive.org/web/20100208184251/http://topcoder.com/home/what-is-topcoder/.

"Amazon Mechanical Turk," Amazon Web Services, Copyright 2010, 4 pages. Accessed Mar. 11, 2010, http://aws.amazon.com/mturk/.

Office Action dated Dec. 19, 2012 regarding USPTO U.S. Appl. No. 12/755,611, 11 pages.

"Application Modeling Process for Computer Design," IBM Technical Disclosure Bulletin, vol. 34, No. 9, Feb. 1992, 6 pages.

Office Action dated Sep. 27, 2013 regarding U.S. Appl. No. 12/755,611, 10 pages.

\* cited by examiner

| 1001 | 1008 | 1010 | 1012 | 1014 | 1016 | 1018 |
|---|---|---|---|---|---|---|
| APPLICATION | IDENTIFICATION | COMPLIANCE | APPLICATION OWNER | VALIDATORS | STATUS | CONFIDENCE LEVEL |
| SUPPORT WEBSITE | SW001 | YES | JANE SMITH | PETER WILSON | ACCEPTED | 100% |
| INTERNAL MESSAGING | IM002 | YES | JOSHUA NG | TIM JOHNSON | REJECTED | 50% |
| DEPARTMENT PLANNER | DP003 | NO | ANNA PETERSON | NORMAN MILES SUSAN ROSS | ACCEPTED | 75% |

SOCIAL NETWORK BASED INFORMATION DISCOVERY ABOUT NETWORK DATA PROCESSING SYSTEMS

BACKGROUND OF THE INVENTION

1. Field of the Invention

The present invention relates generally to data processing systems and, more specifically, to network data processing systems. Still more particularly, the present disclosure relates to a method and apparatus for identifying missing information about a data processing system.

2. Description of the Related Art

Network data processing systems are used for a variety of purposes. For example, network data processing systems are used by organizations to perform various functions. These functions include, for example, business and information technology functions. Network data processing systems are also used by users to obtain information, communicate with others, purchase goods and services, and for other types of uses.

Over time, hardware and software in a network data processing system may need updates, maintenance, replacements, and/or other changes. Further, in some cases, the structure of the network data processing system may be changed or replaced with another network data processing system.

For example, in a network data processing system, server computers in the network data processing system may be replaced or upgraded using new server computers. This type of change includes a number of different processes. The new server computers are connected to the network, and software and data are loaded onto the network computers. Further, services performed by the current server computers are migrated or moved over to the new server computers.

As another example, an organization may perform one or more tasks using the network data processing system. The organization may change the tasks performed using the network data processing system. In some cases, the organization may send the network data processing system or information processing tasks to another organization that performs these information processing tasks. With these types of changes in the use of the network data processing system, changes to the hardware and/or software in the network data processing system may be needed. Further, changes to the management and/or method of delivery of the network data processing system may be needed.

Further, an identification of the hardware and/or software components in the network data processing system is needed to perform the changes to the hardware and/or software. The identification of the hardware and/or software components may also be needed to make changes to the management of these components and/or changes to the delivery of services for these components. Additionally, an identification of the dependencies of the different components in the network data processing system upon other components also may be needed to identify and/or perform an analysis of the changes that may be needed.

The identification of the components within the network data processing system may be performed in a number of different ways. For example, information may be obtained from various sources. These sources may include, for example, data repositories, spreadsheets, and/or databases that identify different components in the network data processing system. Further, these sources may correlate components with each other. This information may be, for example, in an information technology database containing information about server computers and software that has been installed in the network data processing system. Additionally, information may be obtained through various discovery processes. For example, when the network data processing system is in operation, different components in the network data processing system may be polled by a software tool to identify the presence of hardware and software components in the network data processing system.

BRIEF SUMMARY OF THE INVENTION

According to one embodiment of the present invention, a method is present for analyzing a network data processing system. Known information about the network data processing system is obtained by a computer system. A model of the network data processing system is created by the computer system using the known information. Missing information about the network data processing system is identified by the computer system in the model of the network data processing system. A number of people is selected by the computer system for obtaining the missing information. A number of requests to the number of people is sent by the computer system for the missing information. Each request includes the model. In response to receiving a number of responses to the number of requests by the computer system, the computer system updates the model.

BRIEF DESCRIPTION OF THE SEVERAL VIEWS OF THE DRAWINGS

FIG. 10 is an illustration of a validation chart in accordance with an illustrative embodiment;

DETAILED DESCRIPTION OF THE INVENTION

Figure 1:
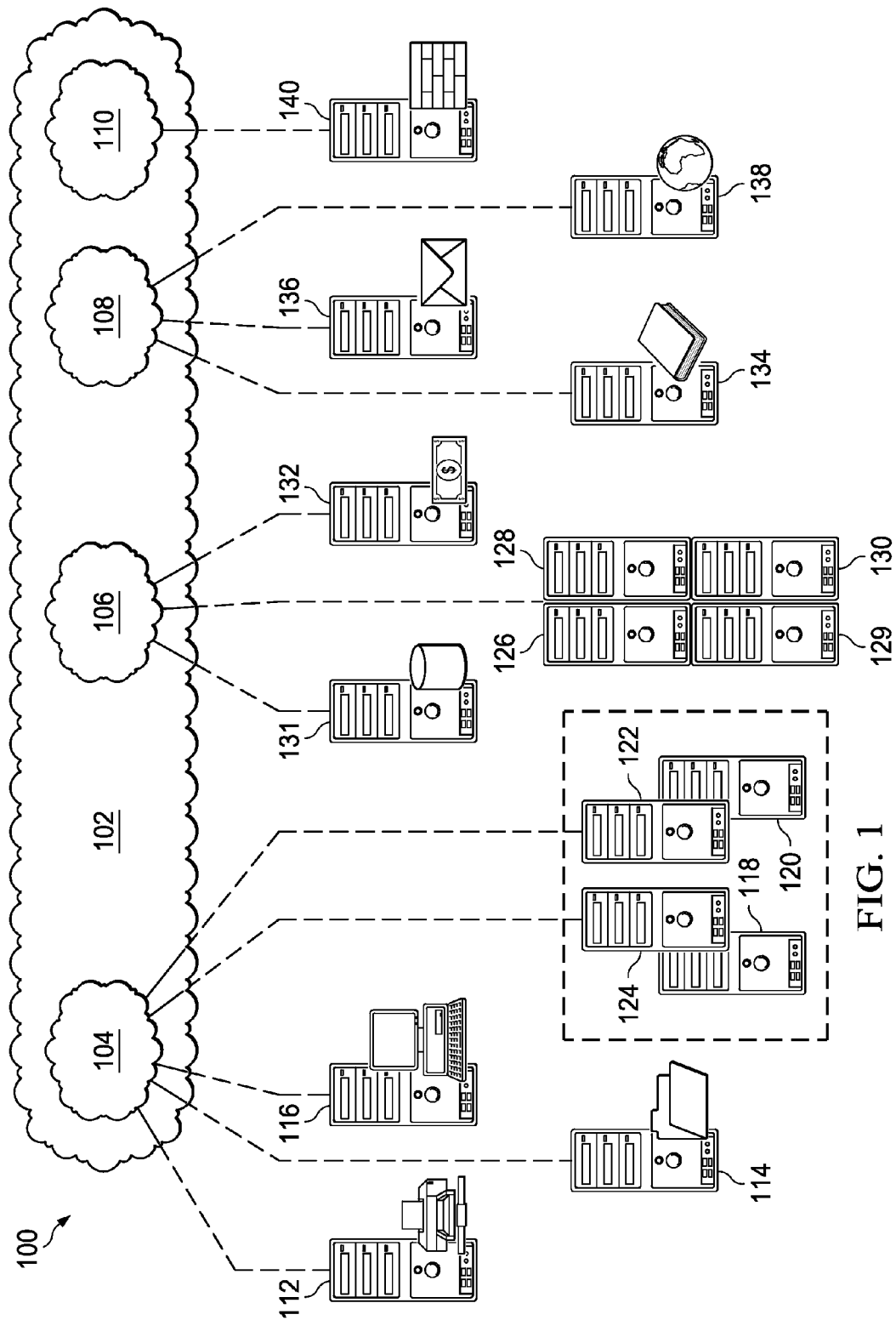
FIG. 1 is an illustration of a network data processing system in accordance with an illustrative embodiment.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CDROM), an optical storage device, a transmission media, such as those supporting the Internet or an intranet, or a magnetic storage device. Note that the computer usable or computer readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction system, apparatus, or device. The computer usable medium may include a propagated data signal with the computer usable program code embodied therewith, either in baseband or as part of a carrier wave. The computer usable program code may be transmitted using any appropriate medium including, but not limited to, wireless, wireline, optical fiber cable, RF, etc.

Computer program code for carrying out operations of the present invention may be written in any combination of one or more programming languages, including an object-oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowcharts and/or block diagrams of methods, apparatus (systems), and computer program products according to embodiments of the invention. It will be understood that each block of the flowcharts and/or block diagrams and combinations of blocks in the flowcharts and/or block diagrams can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide processes for implementing the functions/acts specified in the flowchart and/or block diagram block or blocks.

With reference now to FIG. 1, an illustration of a network data processing system is depicted in accordance with an illustrative embodiment. Network data processing system 100 is a network of computers in which different illustrative embodiments may be implemented. Network 102 is a medium used to provide communications links between various devices and computers connected together within network data processing system 100. Network 102 may include connections, such as wires, wireless communications links, fiber optic cables, and/or other suitable types of media. Network 102 may provide connections between network data processing system 100 and other networks, network data processing systems, and/or the Internet.

As depicted, network data processing system 100 includes network 102. Network 102 is divided into sub-networks 104, 106, 108, and 110.

As illustrated, server computers 112, 114, 116, 118, 120, 122, and 124 are connected to sub-network 104. Server computer 112 is a print server, server computer 114 is a file server, and server computer 116 is a management server. Server computers 118, 120, 122, and 124 are backend servers for batch processing. Network data processing system 100 also includes server computers 126, 128, 129, 130, 131, and 132 connected to sub-network 106. Server computers 126, 128, 129, and 130 are application servers. Server computer 131 is a database server, and server computer 132 is an E-commerce server.

Also depicted in network data processing system 100 are server computers 134, 136, and 138, which are connected to sub-network 108. Server computer 134 is a lightweight directory access protocol (LDAP) and directory server, server computer 136 is an email server, and server computer 138 is a web server. Server computer 140 is connected to sub-network 110. Sub-network 110 is separate from sub-network 108. Server computer 140 functions as a firewall and proxy server in this example. Different clients may connect to network 102 and obtain server services from the different server computers.

In the depicted example, network data processing system 100 may take a number of different forms. For example, network data processing system 100 may include one or more networks in the form of an internet, a local area network, a wide area network, or some other type of network. Network data processing system 100 may include additional server computers, clients, and/or other devices not shown. In the different illustrative examples, one or more processes and information technology services may be implemented in one or more server computers. These processes may be used to identify information about network data processing system 100.

Figure 2:
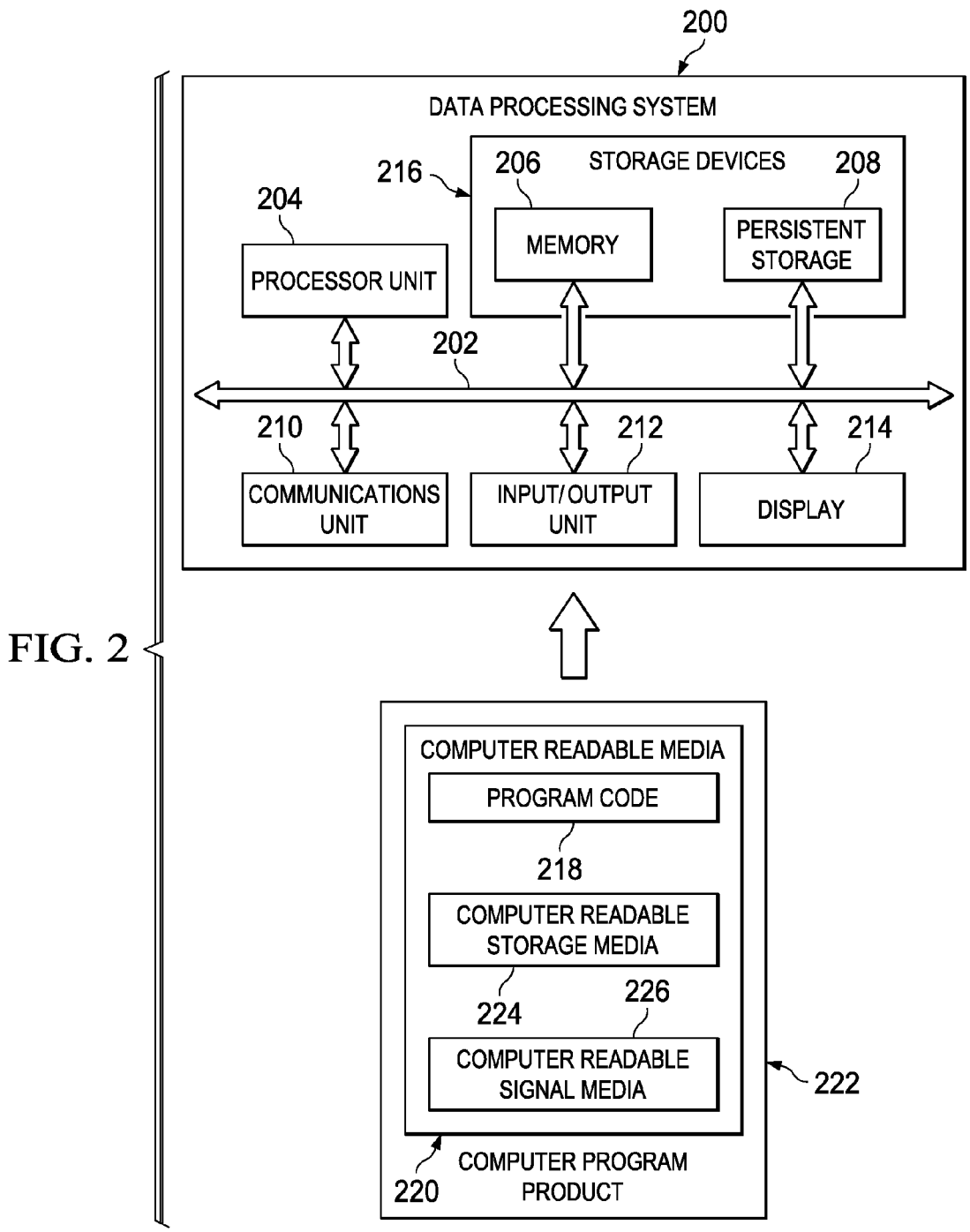
FIG. 2 is a block diagram of a data processing system in which illustrative embodiments may be implemented.

With reference now to FIG. 2, an illustration of a block diagram of a data processing system is shown in which illustrative embodiments may be implemented. Data processing system 200 is an example of a computer in which computer usable program code or instructions implementing the processes may be located for the illustrative embodiments. Data processing system 200 is an example of a computer that may be used to implement the different server computers illustrated in network data processing system 100 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 runs instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 and run by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 and run by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data.

Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

The different illustrative embodiments take into account and recognize a number of different considerations. For example, when a network data processing system is large in size, the network data processing system may include hundreds or thousands of software components and hardware components. The different illustrative embodiments recognize that with large numbers of components, instrumentation and access to various administrative domains may be needed to identify information about components as well as dependencies between components in a network data processing system.

The different illustrative embodiments also recognize and take into account that the information in currently available repositories for network data processing systems may often be incomplete and/or inconsistent with the actual network data processing systems. This information may also be inconsistent with the information that may be collected using existing software-based discovery tools. Further, the software programs used to obtain information about the different components often require administrative privileges. These privileges may not be available or may be difficult to acquire within a short period of time.

The different illustrative embodiments recognize that obtaining information using software programs may be expensive and time consuming. Further, the different illustrative embodiments also recognize and take into account that the software tools used to identify information about network data processing systems have limitations and may not provide all of the information needed to make decisions about changes to network data processing systems. Further, the existing software-based discovery tools often do not identify data constraints. For example, security and compliance-related constraints often cannot be identified using software tools. As yet another example, reliability, fault tolerance, and disaster recovery related requirements and dependencies may not be easily detected using existing software-based discovery tools.

The different illustrative embodiments recognize that information in documents and data repositories is often incomplete and missing about a network data processing system. This missing information is needed to perform many types of analyses needed before making changes to a network data processing system or before performing any type of transformation of the network data processing system. The different illustrative embodiments also recognize and take into account that manually collecting the missing information is tedious, time consuming, and error prone.

Thus, the illustrative embodiments provide a method and apparatus for analyzing a network data processing system. Current information about the network data processing system is obtained by a computer system. A model of the network data processing system is created using the current information. Missing information about the network data processing system in the model of the network data processing system is identified. A number of people is selected for obtaining the missing information. A number of requests is sent to the number of people for the missing information. Responsive to receiving a number of responses to the number of requests, the model is updated using these responses. In these examples, each of the requests includes the model for use by the number of people.

Figure 3:
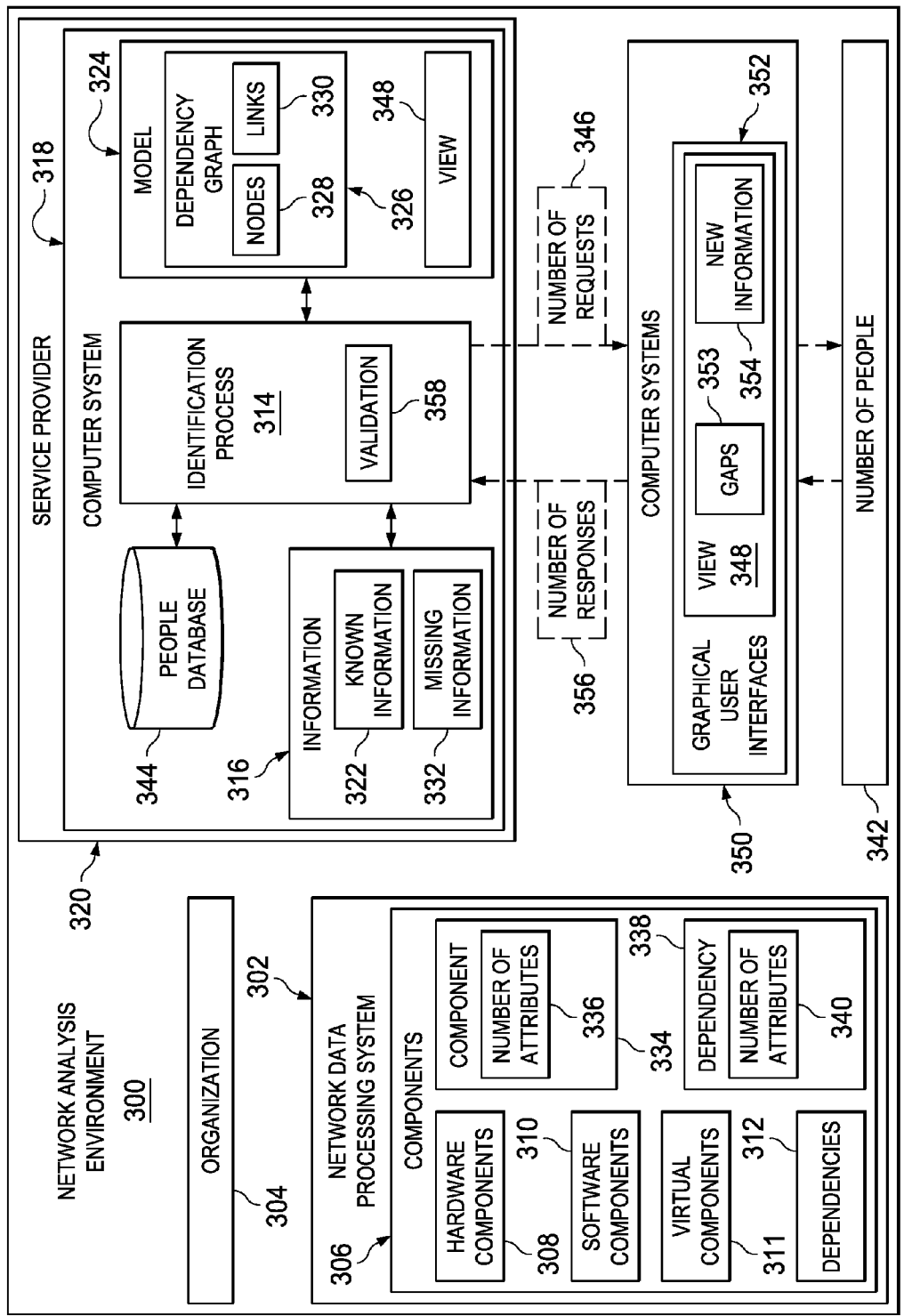
FIG. 3 is an illustration of a network analysis environment in accordance with an illustrative embodiment.

With reference now to FIG. 3, an illustration of a network analysis environment is depicted in accordance with an illustrative embodiment. Network analysis environment 300 may be used to identify information about network data processing system 302. Network data processing system 100 in FIG. 1 is an example of one implementation for network data processing system 302.

Network data processing system 302 in network analysis environment 300 may be used by organization 304 to perform functions. Network data processing system 302 may be, for example, used as a data center, a financial services system, or some other suitable type of system for performing functions.

Network data processing system 302 includes components 306. Components 306 include, for example, at least one of hardware components 308, software components 310, virtual components 311, and other suitable components. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

These components have dependencies 312. A dependency between two components within components 306 means that one component requires some other component to perform an operation. For example, a first server may need email addresses stored in a second server to send email messages to customers. Thus, a dependency between the first server and the second server is present.

In these illustrative examples, identification process 314 is used to identify information 316 about network data processing system 302. Information 316 may then be used to perform a number of different operations on network data processing system 302. For example, information 316 may be used to make changes for upgrades and maintenance. Information 316 may also be used to prepare for a transformation of network data processing system 302 and/or a migration of network data processing system 302. The migration of network data processing system 302 may be, for example, to a cloud network data processing system. Known information 322 and missing information 332 form substantially all of information 316 in these examples.

In this illustrative example, missing information 332 includes information that is missing for components in network data processing system 302 identified for network data processing system 302. Missing information 332 also includes information that is missing for components in network data processing system 302 that have not been identified or are not known to be components in network data processing system 302.

Identification process 314 runs on computer system 318. Computer system 318 is a number of computers and may be implemented using data processing system 200 in FIG. 2. Computer system 318 is located at service provider 320. Organization 304 is a client of service provider 320. Identification process 314 obtains known information 322 about network data processing system 302. Known information 322 may be obtained from a number of different sources. For example, without limitation, known information 322 may be obtained from at least one of software tools running on components 306, a bill of materials for network data processing system 302, documents, databases, spreadsheets, and other suitable sources.

Identification process 314 then creates model 324 of network data processing system 302. In these illustrative examples, model 324 takes the form of dependency graph 326. Dependency graph 326 includes nodes 328 and links 330. Nodes 328 represent components 306. Links 330 represent dependencies 312.

Thereafter, identification process 314 identifies missing information 332 about network data processing system 302 in model 324 of network data processing system 302. Information in missing information 332 may be identified in a number of different ways. For example, component 334 in components 306 includes number of attributes 336. If any of number of attributes 336 are missing, that missing information is part of missing information 332.

As another example, dependency 338 includes number of attributes 340. If any values associated with number of attributes 340 are missing, those missing values may be part of missing information 332. Additionally, components in network data processing system 302 that are not identified in known information 322 are part of missing information 332. In other words, missing information 332 may include an absence of components or attributes where a component in components 306 or attribute should be present.

Thereafter, identification process 314 identifies number of people 342 from people database 344. Number of people 342 is identified based on missing information 332. Number of people 342 is people who may be able to provide missing information 332. Identification process 314 sends number of requests 346 to number of people 342. Number of requests 346 is for missing information 332.

In the different illustrative examples, not all of missing information 332 may be identified at the same time. Number of requests 346 for missing information 332 may be sent as missing information 332 is identified and/or as number of people 342 are associated with the identified missing information 332. Each request in number of requests 346 may include model 324 or view 348 of model 324. View 348 may include only portions of model 324 or may be presented in different ways. View 348 may be selected as one that provides the greatest capability to obtain missing information 332 from number of people 342.

In these illustrative examples, number of people 342 may receive number of requests 346 at computer systems 350 at which number of people 342 are located. Graphical user interfaces 352 at computer systems 350 display number of requests 346 to number of people 342. In displaying number of requests 346 on graphical user interfaces 352, view 348 of model 324 may be presented.

In displaying view 348 of model 324 on graphical user interfaces 352, gaps 353 may be displayed. Gaps 353 may include, for example, an identification of missing components, missing attributes or components, missing dependencies, missing attributes for dependencies, and other suitable information. Gaps 353 may be presented in text or graphically.

Number of people 342 may enter changes to view 348 of model 324. For example, number of people 342 may enter new information 354 into graphical user interfaces 352. New information 354 may supply missing information 332. New information 354 may take the form of additional values or attributes, new components, deletions of components, deletions of attributes, changing values, and other suitable information. All of this information may be used to supply missing information 332. In these illustrative examples, missing information 332 may include changes, such as a removal or change of dependencies, a removal of components, or other deletions in addition to or in place of changing values or adding values to known information 322.

New information 354 may then be sent back to identification processes 314 in number of responses 356. With new information 354, missing information 332 may be identified. As a result, identification process 314 updates model 324.

In addition, identification process 314 may perform validation 358 on new information 354. Validation 358 means that new information 354 is processed to determine whether new information 354 should be used. The determination of whether new information 354 should be used may depend on who in number of people 342 supplied new information 354.

In this manner, model 324 may be made more accurate and complete as compared to just using software tools. With model 324 in a more complete form, organization 304 may make decisions about changes to network data processing system 302. These changes may include performing changes for maintenance, upgrading components, and even transforming and migrating to a new network data processing system.

The illustration of network analysis environment 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative examples, identification process 314 may be located in a location other than in computer system 318 at service provider 320. For example, identification process 314 may run on a computer within network data processing system 302. In yet other illustrative examples, number of responses 356 may not supply new information 354 about network data processing system 302. Instead, number of responses 356 may include identification of other people in people database 344 that may supply missing information 332.

Figure 4:
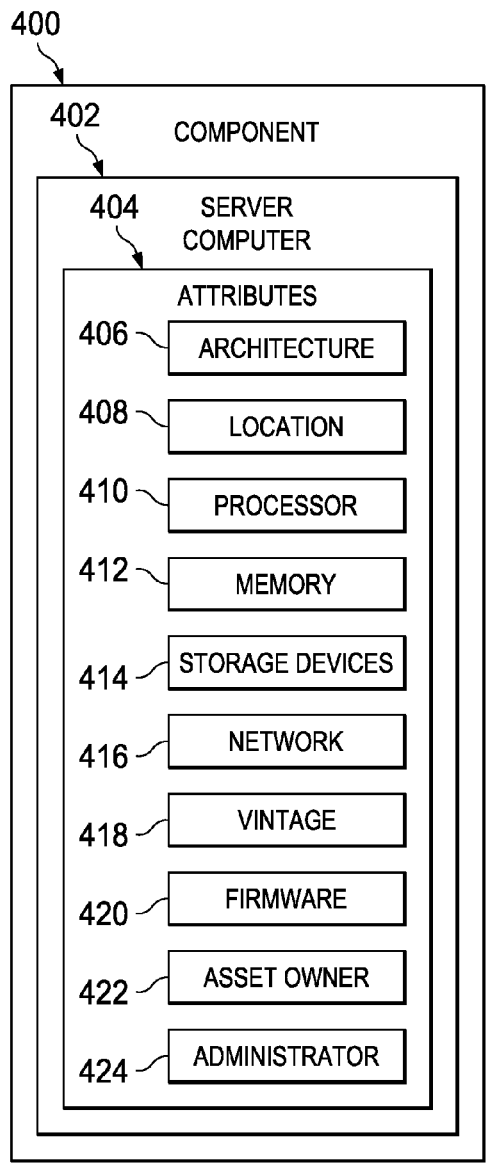
FIG. 4 is a block diagram of information for a component in accordance with an illustrative embodiment.

Turning now to FIG. 4, a block diagram of information for a component is depicted in accordance with an illustrative embodiment. Component 400 is an example of one implementation for a component in components 306 in FIG. 3. In this illustrative example, component 400 is server computer 402 and has attributes 404. Attributes 404 are examples of information that may be used in a model. These attributes include architecture 406, location 408, processor 410, memory 412, storage devices 414, network 416, vintage 418, firmware 420, asset owner 422, and administrator 424.

Architecture 406 identifies the architecture for server computer 402. Location 408 is the physical location of server computer 402. Processor 410 identifies the processors within server computer 402. Processor 410 may include, for example, an identification of a number of cores, a number of sockets, and speed. Memory 412 identifies the amount of random access memory present in server computer 402. Storage devices 414 identify disk types and capacity in server computer 402.

Network 416 identifies the number of network interface cards, the speed of the cards, as well as media access control addresses for the cards. Vintage 418 identifies the manufacturer, date, type, and model for server computer 402. Firmware 420 identifies a basic input/output system version used in server computer 402. Asset owner 422 identifies the owner or organization that has server computer 402. Administrator 424 identifies the person who manages server computer 402.

Figure 5:
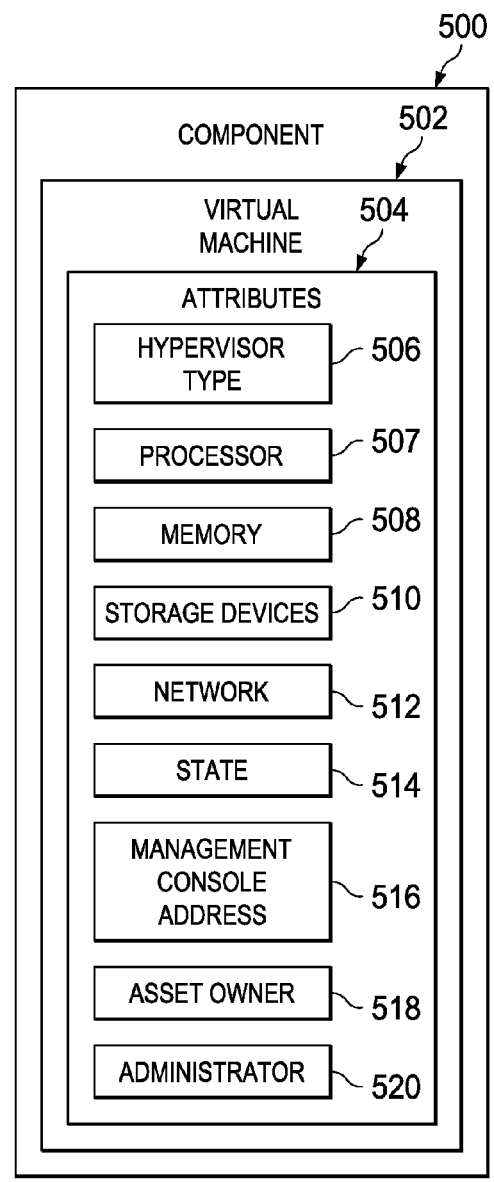
FIG. 5 is a block diagram of information for a component in accordance with an illustrative embodiment.

With reference now to FIG. 5, an example of information for a component is depicted in accordance with an illustrative embodiment. Component 500 is an example of information for virtual components 311 in FIG. 3. In this illustrative example, component 500 takes the form of virtual machine 502. This component is a virtual component in this example. Virtual machine 502 has attributes 504. Attributes 504 are examples of information that may be used in a model. These attributes include, for example, hypervisor type 506, processor 507, memory 508, storage devices 510, network 512, state 514, management console address 516, asset owner 518, and administrator 520.

Hypervisor type 506 is an identification of the type of hypervisor used to host, monitor, and/or control virtual machine 502. Processor 507 identifies the number of cores allocated to the virtual machine. Memory 508 identifies random access memory allocated to virtual machine 502. Storage devices 510 identify the storage capacity and storage devices allocated to virtual machine 502. Network 512 identifies network connectivity, media access control addresses, and Internet protocol addresses for virtual machine 502.

State 514 indicates the state of virtual machine 502. State 514 may be, for example, running, suspended, archived, or some other suitable state. Management console address 516 identifies the address of a computer that may be used to manage virtual machine 502.

Asset owner 518 identifies the owner of virtual machine 502. Administrator 520 identifies the person managing virtual machine 502.

The illustrations of information for component 400 in FIG. 4 and component 500 in FIG. 5 are provided only for purposes of illustration and are not meant to limit the manner in which different illustrative embodiments may be implemented. Other illustrative embodiments may include information for other types of components and may include other attributes in addition to or in place of the ones shown. For example, information may be present for a component in the form of printers, database servers, applications, and other suitable types of components. In these examples, the components illustrated are for hardware components that may be physical or virtual. In other examples, the components may take the form of software components in systems, such as databases or web server processes.

Figure 6:
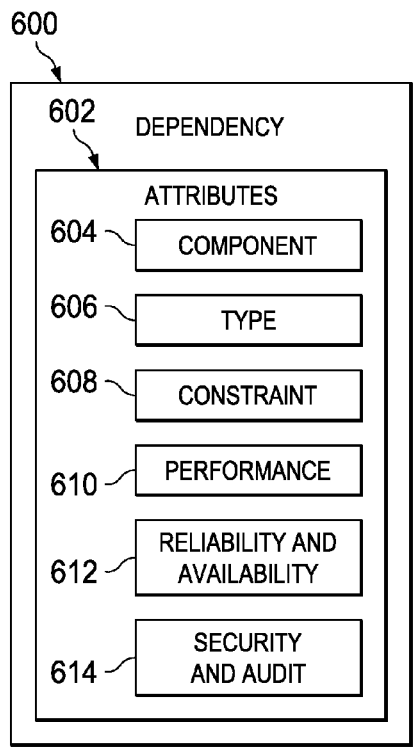
FIG. 6 is an illustration of information for a dependency in accordance with an illustrative embodiment.

Turning now to FIG. 6, an illustration of information for a dependency is depicted in accordance with an illustrative embodiment. In this illustrative example, dependency 600 is an example of information for dependency 338 in FIG. 3.

In this illustrative example, dependency 600 has attributes 602. Attributes 602 are examples of information in a model. Attributes 602 include, for example, component 604, type 606, constraint 608, performance 610, reliability and availability 612, security and audit 614, and other suitable types of attributes. Component 604 identifies the attribute that identifies the components for which the dependency is present.

Type 606 is the type of dependency. This dependency may be, for example, a hard dependency or a soft dependency. For example, a hard dependency is an essential or required dependency, while a soft dependency is a recommended or preferred dependency.

Constraint 608 identifies constraints for the dependency. For example, constraints may be present for locations of components or supporting components. Constraint 608 also may include, for example, co-location and isolation constraints. A co-location constraint is present when two or more components need to have the same location. For example, an application server and a database may need to be located on the same sub-network to provide a desired level of performance. An isolation constraint is present when a component needs to be isolated or kept separate from other components. For example, confidential information may need to be processed in a secure environment. To achieve this security, databases that store the confidential information need to be isolated from other databases that may store publically accessible data.

Performance 610 includes the performance of the particular dependency. For example, performance 610 may identify network latency and bandwidth specifications. Response time requirements and priority in a shared environment also may be identified in performance 610. Reliability and availability 612 identifies various requirements, such as permitted down time on supporting resources for services, fail-over requirements, permitted recovery time in case of failures, and other suitable attributes. Security and audit 614 identifies the procedures and/or requirements for handling certain types of data. For example, security and audit 614 may identify procedures for processing financial data. The processing of the financial data may need to be performed in a manner such that the financial data is ready for auditing. As another example, the storage and/or processing of confidential data may require particular security procedures. These security procedures may be identified in security and audit 614.

Figure 7:
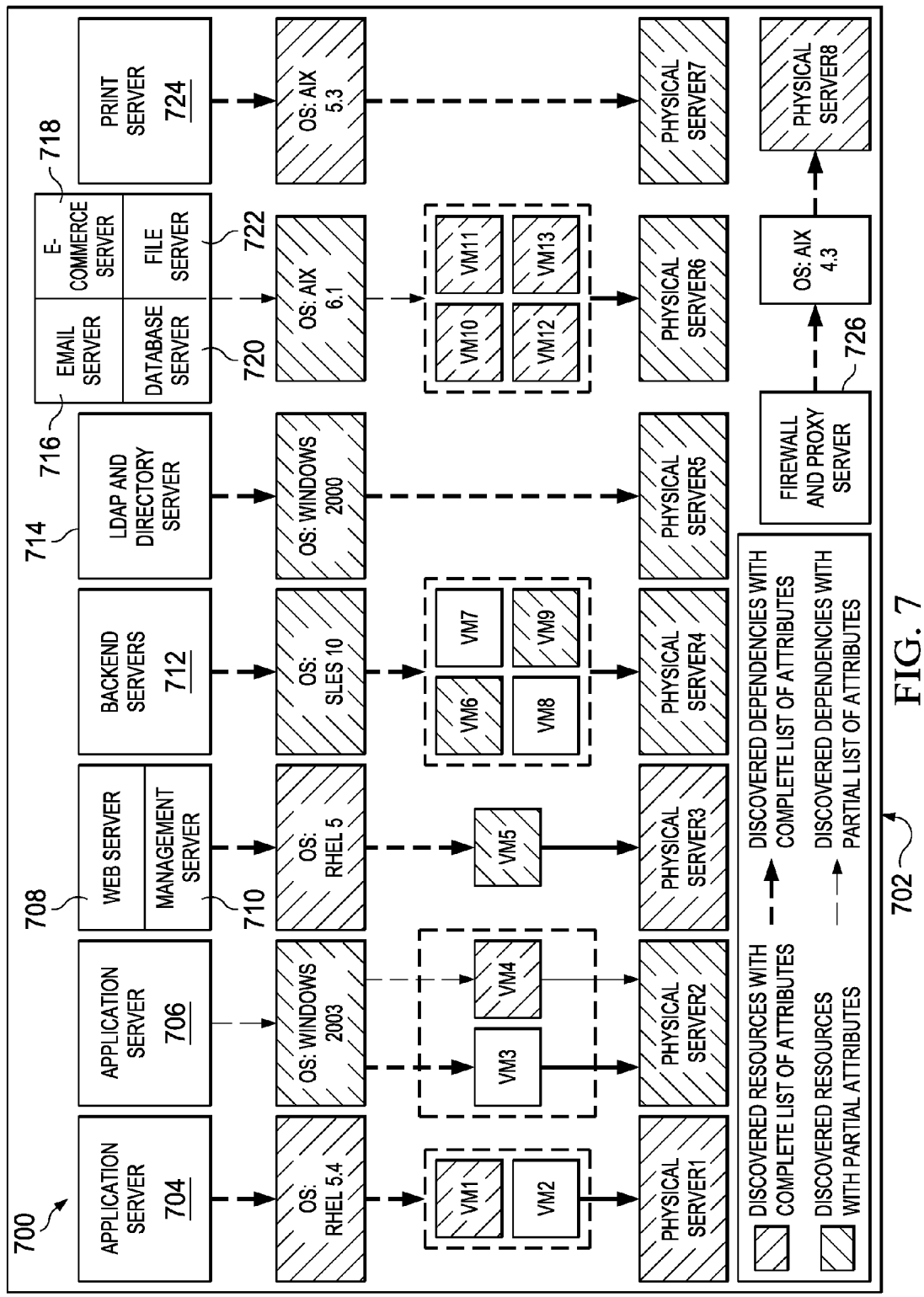
FIG. 7 is an illustration of current information for a network data processing system in accordance with an illustrative embodiment.

With reference now to FIG. 7, an illustration of current information for a network data processing system is depicted in accordance with an illustrative embodiment. In this example, current information 700 is an example of known information 322 in FIG. 3 for network data processing system 100 in FIG. 1. Current information 700 may be displayed on graphical user interfaces 352 in FIG. 3.

As can be seen in this example, current information 700 may include components with complete information and components with partial information. Additionally, dependencies with complete information and dependencies with partial information also may be present. Partial information means, in these examples, that some of the attributes for the components or dependencies are not identified in current information 700. In this example, current information 700 takes the form of model 702. In this illustrative example, model 702 takes the form of a dependency graph.

Model 702 includes components that are examples of the components in FIG. 1. Model 702 includes application server 704, application server 706, web server 708, management server 710, backend servers 712, lightweight directory access protocol (LDAP) and directory server 714, email server 716, E-commerce server 718, database server 720, file server 722, print server 724, and firewall and proxy server 726. Application server 704 and application server 706 are examples of server computers 126, 128, 129, and 130 in FIG. 1. Web server 708 is an example of server computer 138. Management server 710 is an example of server computer 116. Backend servers 712 for batch processing are examples of server computers 118, 120, 122, and 124. Lightweight directory access protocol (LDAP) and directory server 714 is an example of server computer 134. Email server 716 is an example of server computer 134. E-commerce server 718 is an example of server computer 132. Database server 720 is an example of server computer 131. File server 722 is an example of server computer 114. Print server 724 is an example of print server 112. Firewall and proxy server 726 is an example of server computer 140.

Figure 8:
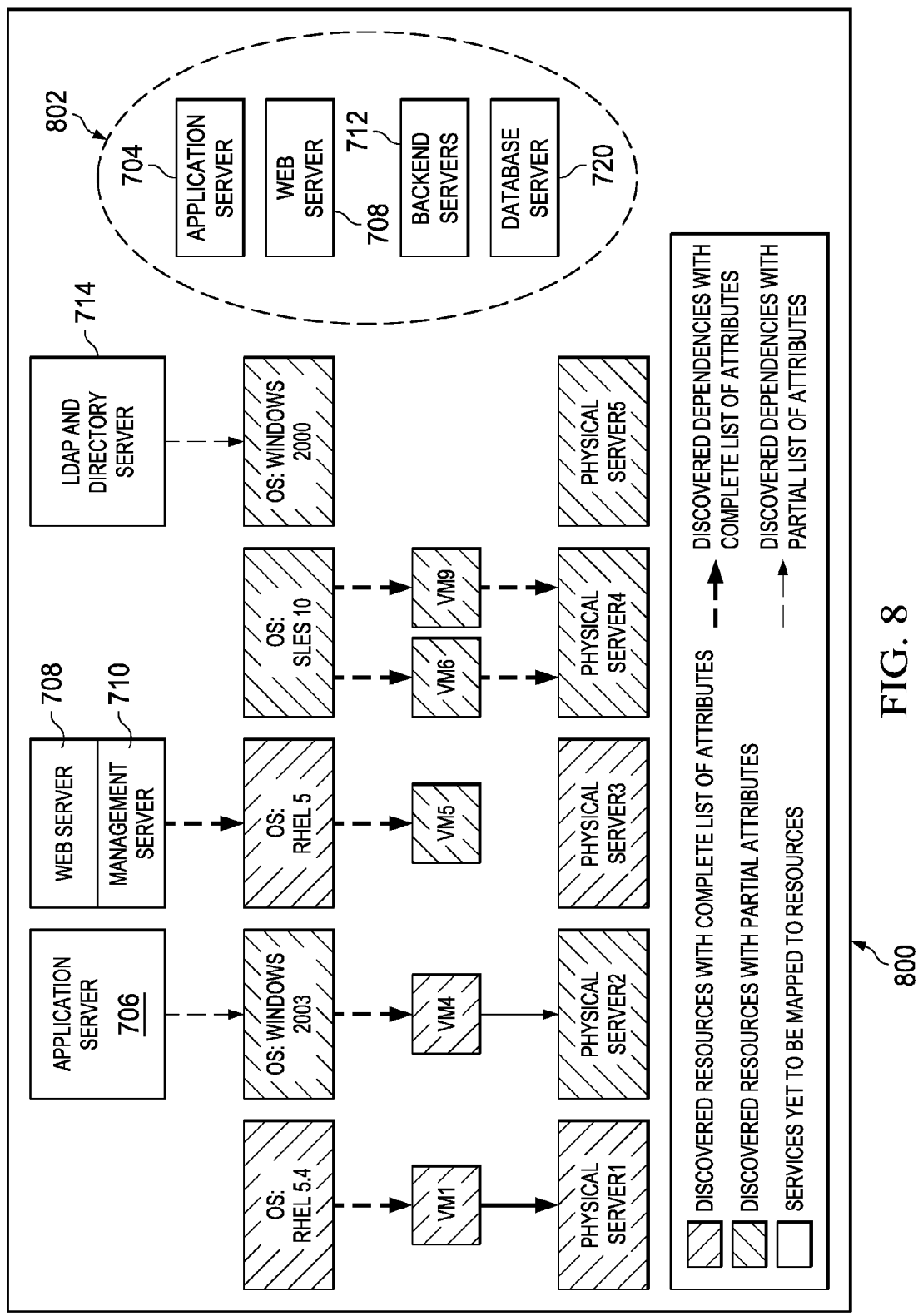
FIG. 8 is an illustration of a view of a model for a network data processing system in accordance with an illustrative embodiment.

With reference now to FIG. 8, an illustration of a view of a model for a network data processing system is depicted in accordance with an illustrative embodiment. In this example, view 800 is an example of view 348 for model 324 in FIG. 3 of network data processing system 100 in FIG. 1. In particular, view 800 is a view of model 702 in FIG. 7. In this example, section 802 identifies components with missing information.

View 800 is an example of a view that may be presented on graphical user interfaces 352 in FIG. 3 on a display device. In this example, a user may insert new nodes, add missing dependencies, add missing attributes, or add other information to view 800. Additionally, the user may delete information from view 800. For example, the user may delete a node for a component, a dependency, or an attribute. Additionally, the user may make changes to the dependencies, attributes, or values through the graphical user interface. Further, view 800 also may be used to verify existing data and determine whether the information in view 800 is accurate.

Figure 9:
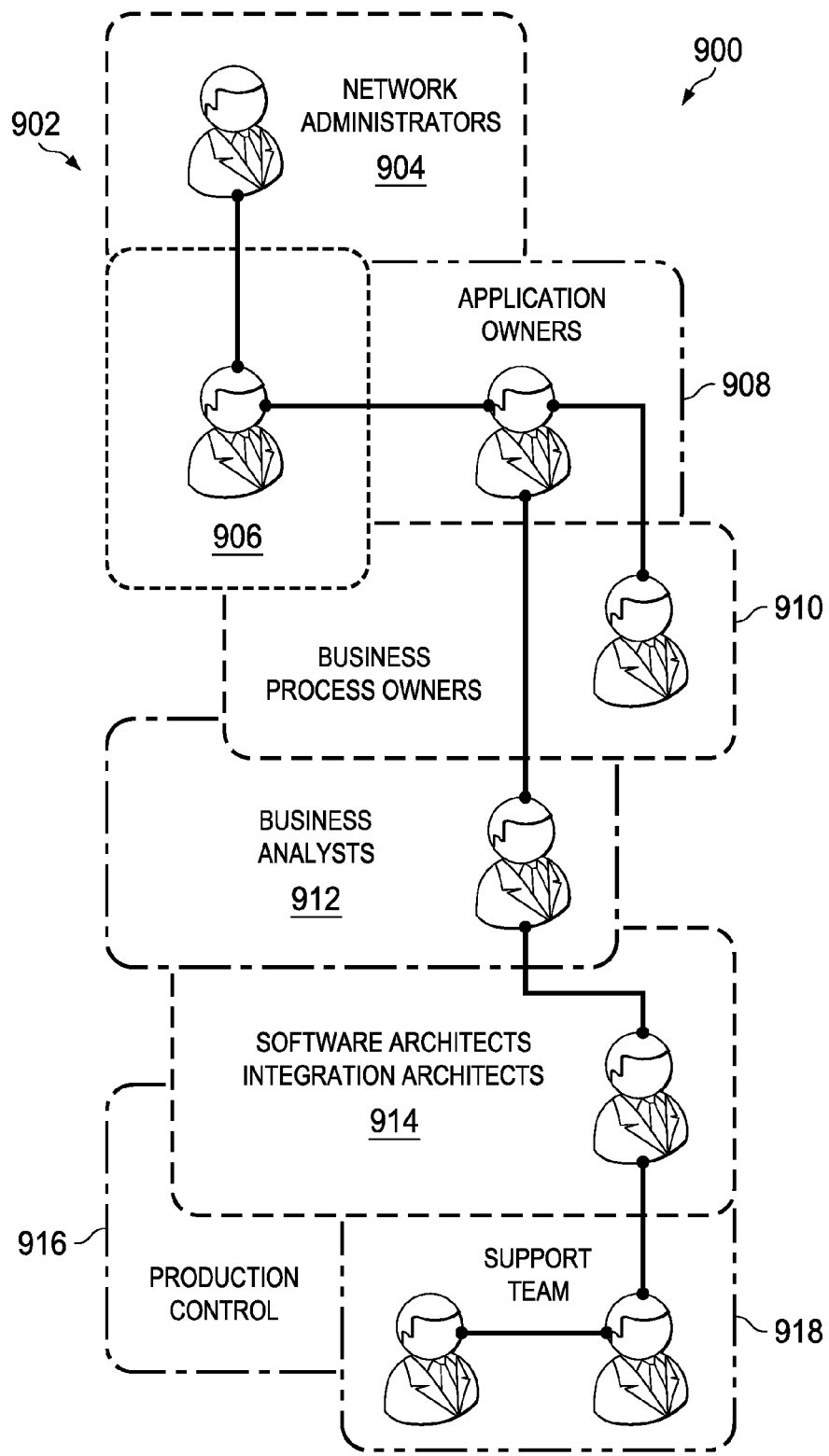
FIG. 9 is an illustration of a model of roles of people in accordance with an illustrative embodiment.

With reference now to FIG. 9, an illustration of a model of roles of people is depicted in accordance with an illustrative embodiment. In this illustrative example, model 900 takes the form of a cloud. The cloud includes roles 902 for people. Model 900 may be used to select a number of people of whom to send a number of requests for missing information about a network data processing system. The network data processing system may be, for example, network data processing system 302 in FIG. 3. Model 900 may be used to select number of people 342 in FIG. 3.

As depicted, roles 902 include network administrators 904, security owners 906, application owners 908, business process owners 910, business analysts 912, software and integration architects 914, production controllers 916, and support team 918. Each of roles 902 is associated with a certain amount and type of information about at least one of the components in a network data processing system, such as network data processing system 302 in FIG. 3.

The overlaps between roles 902 indicate an exchange of information between people having one of roles 902. In particular, these overlaps indicate an exchange of information during normal, routine activities. This exchange of information may include sending and/or receiving information. For example, for an overlap of two roles, information known by a person having one of these roles may be sent to another person having another of these roles. Further, these overlaps may also indicate that the roles that overlap possess at least a portion of information that is substantially the same. For example, two roles may both possess information about a production server of a particular application.

Further, network administrators 904 and security owners 906 may send and/or receive information to and/or from each other. Security owners 906, application owners 908, and business process owners 910 may send and/or receive information to and/or from each other. Business analysts 912 may send and/or receive information to and/or from business process owners 910 and software and integration architects 914. Production controllers 916 may send and/or receive information to and/or from software and integration architects 914 and support team 918.

A link between two people having different roles in model 900 indicates that both people have knowledge of a portion of information. The two people may have knowledge of the portion of information by being able to access the same source for the information, by independently generating the same information, by exchanging the information with each other, by performing operations to collect the information, and/or by some other suitable manner. The operations performed to collect the information may be the same or different for the two people.

For example, network administrators 904 and security owners 906 both have knowledge of a portion of information. Security owners 906 and application owners 908 both have knowledge of a portion of information. Application owners 908 and business process owners 910 both have knowledge of a portion of information. Application owners 908 and business analysts 912 also both have knowledge of a portion of information. Business analysts 912 and software and integration architects 914 both have knowledge of a portion of information. Software and integration architects 914 and production controllers 916 both have knowledge of a portion of information. Production controllers 916 and support team 918 both have knowledge of a portion of information.

With reference now to FIG. 10, an illustration of a validation chart is depicted in accordance with an illustrative embodiment. In this illustrative example, validation chart 1000 presents the results of a validation of new information, such as validation 358 of new information 354 in FIG. 3. As depicted, validation chart 1000 presents the results of a validation of new information for a number of components in a network data processing system, such as network data processing system 100 in FIG. 1 and/or network data processing system 302 in FIG. 3. These components are software applications 1001 in this illustrative example.

The software applications include support website 1002, internal messaging 1004, and department planner 1006. Validation chart 1000 presents information for these components. This information includes identifier 1008, compliance 1010, application owner 1012, validator 1014, status 1016, and confidence level 1018. Identifier 1008 is the identifier of the software application. Compliance 1010 is an indication of whether a particular application is subject to a number of parameters. For example, in this illustrative example, compliance 1010 is an indication of whether a particular application is subject to the United States International Traffic in Arms Regulation (ITAR). Application owner 1012 is the owner and/or user of the application.

Validator 1014 is the number of validators who validated the new information. In some illustrative examples, the number of validators may be in, for example, number of people 342 in FIG. 3. Status 1016 is the result of the validation performed on the new information for the software applications. Confidence level 1018 is the percentage of confidence in the result of the validation. The percentage of confidence may be based on a number of factors. These factors include, for example, without limitation, the reputation of the validators, the amount of information possessed by the providers of the new information, the quality of information possessed by the providers of the new information, the accuracy of the validation process, and/or other suitable factors.

As depicted, new information for support website 1002 is accepted. This result has a confidence level of 100 percent. New information for internal messaging 1004 is rejected. This result has a confidence level of 50 percent. The validation of the new information may be repeated and/or performed by a different validator to increase the confidence level for the result of the validation. In some examples, new information for internal messaging 1004 may be requested from a different set of people. New information for department planner 1006 is validated by two validators and is accepted. This result has a confidence level of 75 percent.

Figure 11:
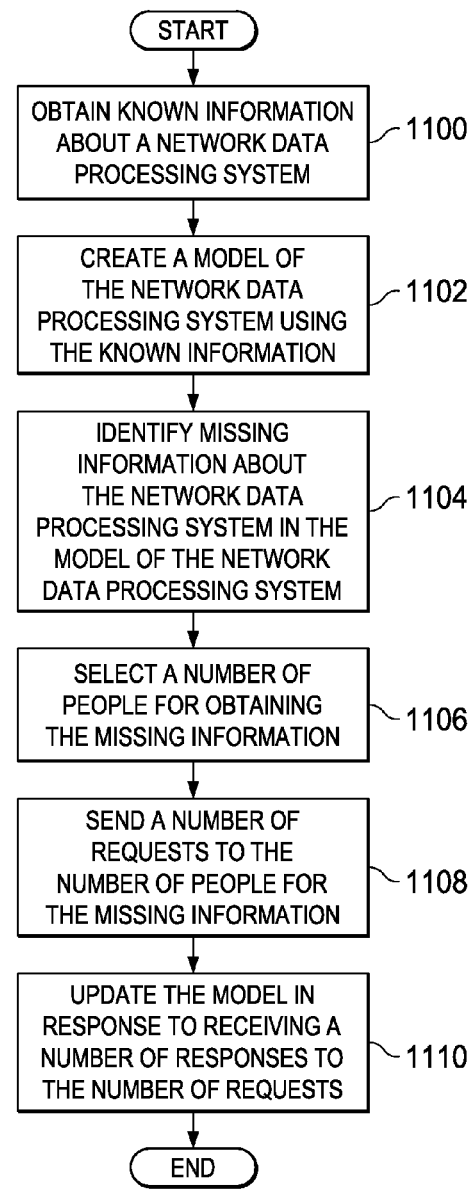
FIG. 11 is an illustration of a flowchart of a process for analyzing a network data processing system in accordance with an illustrative embodiment.

With reference now to FIG. 11, an illustration of a flowchart of a process for analyzing a network data processing system is depicted in accordance with an illustrative embodiment. The process illustrated in FIG. 11 may be implemented for network data processing system 100 in FIG. 1 and/or network data processing system 302 in FIG. 3.

The process illustrated in FIG. 11 may be performed by a computer system. The computer system may be comprised of one or more computers. These computers are hardware. The computer system may take the form of, for example, an ad hoc network connecting a number of computers through wireless links.

The process begins by obtaining known information about the network data processing system (step 1100). The known information may include an identification of a number of hardware and/or software components in the network data processing system. Further, the known information may include a number of dependencies between the number of hardware and/or software components. The process then creates a model of the network data processing system using the known information (step 1102). The model may include a number of nodes to represent the number of hardware and/or software components and a number of links to represent the number of dependencies.

Thereafter, the process identifies missing information about the network data processing system in the model of the network data processing system (step 1104). The process selects a number of people for obtaining the missing information (step 1106). The number of people may be selected from, for example, a database of experts for the different hardware and/or software components in the network data processing system.

The process sends a number of requests to the number of people for the missing information (step 1108). In this illustrative example, each request sent includes a model. This model may be the model created in step 1102. In other examples, the model may be a different view of the model created in step 1102. The model in each of the requests may be displayed to the number of people on a graphical user interface, such as graphical user interfaces 352 in FIG. 3.

The process then updates the model in response to receiving a number of responses to the number of requests (step 1110), with the process terminating thereafter. The number of responses includes the missing information for the model of the network data processing system. For example, the number of responses may include an identification of a number of missing components in the model, an identification of a number of missing dependencies in the model, values of one or more missing attributes, and/or other suitable information about the network data processing system.

Figure 12:
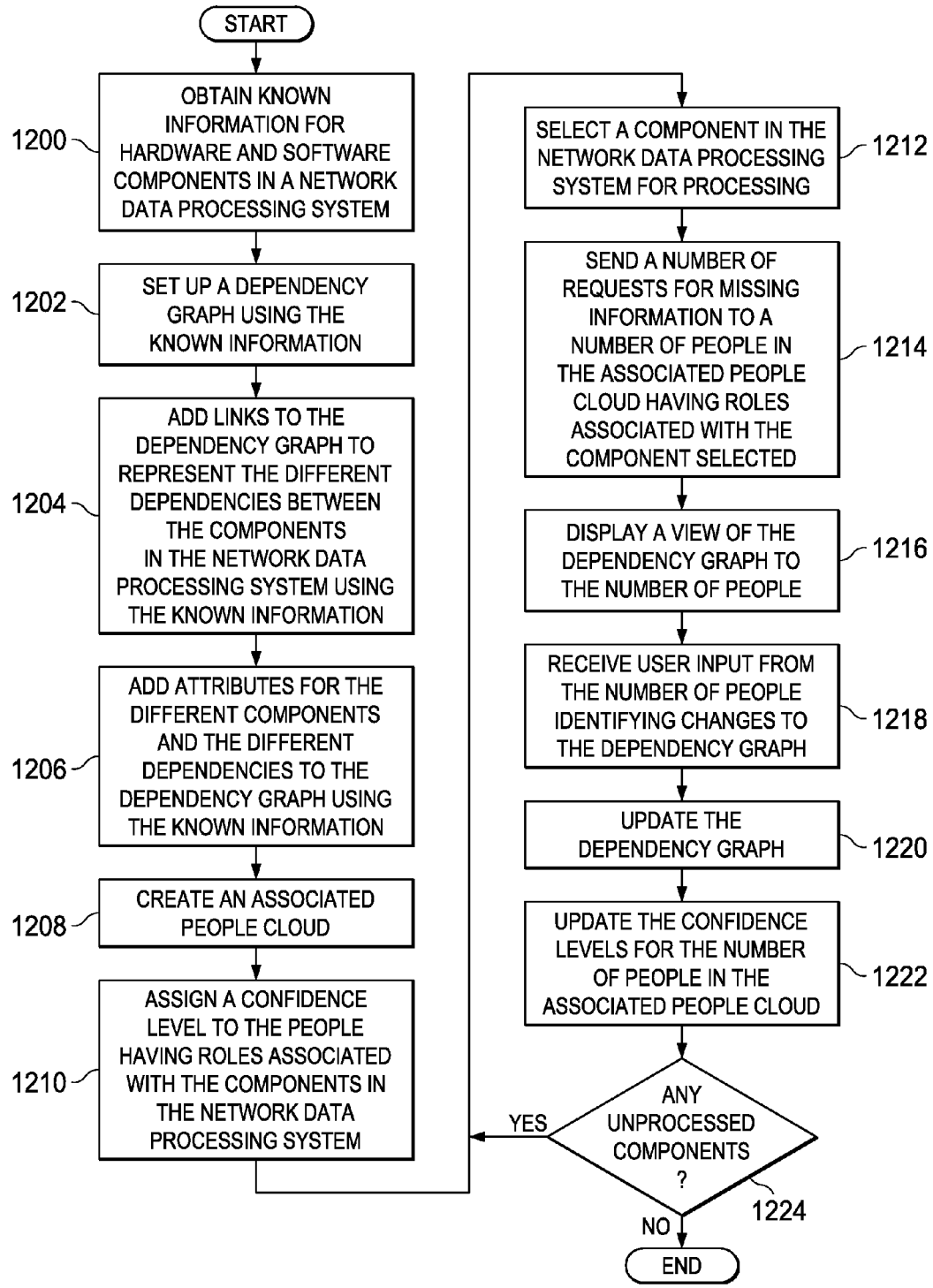
FIG. 12 is an illustration of a flowchart of a process for analyzing a network data processing system in accordance with an illustrative embodiment.

With reference now to FIG. 12, an illustration of a flowchart of a process for analyzing a network data processing system is depicted in accordance with an illustrative embodiment. The process illustrated in FIG. 12 may be implemented in network data processing system 100 in FIG. 1 and/or network data processing system 302 in FIG. 3.

The process begins by obtaining known information for hardware and software components in a network data processing system (step 1200). The known information may include, for example, without limitation, identification information, user information, operating requirements, and/or other suitable information.

The process sets up a dependency graph using the known information (step 1202). The dependency graph may be, for example, model 702 in FIG. 7. The dependency graph is set up using the known information for the different components. The process then adds links to the dependency graph to represent the different dependencies between the components in the network data processing system using the known information (step 1204). The process also adds attributes for the different components and the different dependencies to the dependency graph using the known information (step 1206).

The process creates an associated people cloud (step 1208). The associated people cloud may be, for example, model 900 in FIG. 9. The associated people cloud may include people having roles that allow them to have knowledge of information about the different components in the network data processing system.

The process then assigns a confidence level to the people having roles associated with the components in the network data processing system (step 1210). A component may be associated with a number of roles. For example, a component may be associated with the roles of designer of the component, user of the component, developer of the component, owner of the component, and/or other roles for the component.

The confidence level is based on, for example, the type of role, the relationship of the role to the components, how long the relationship has been present, a reputation of a person, an ability of a person to perform a particular role, the amount of knowledge of information possessed by the person, and/or other suitable factors. Further, the confidence level determines the quality of information being provided by the people having the roles associated with the components. The confidence level for the person may be determined by a number of factors, such as, for example, the role, the duration of time for which a person has the role, and how close that duration of time is to the present time.

The relationships between people having different roles associated with different components, the confidence levels for the people, and/or other suitable information may be presented in a model of the people having the roles. The model may take the form of, for example, a cloud of people.

The process selects a component in the network data processing system for processing (step 1212). The process then sends a number of requests for missing information to a number of people in the associated people cloud having roles associated with the component selected (step 1214). The missing information may include, for example, usage of the components, service expectancy, operating requirements, dependency information, and/or other suitable information. In this illustrative example, a request may be sent to a person considered to be an expert on the selected component or a person with the highest confidence level for the selected component.

The process displays a view of the dependency graph to the number of people (step 1216). In step 1216, the dependency graph is displayed using a graphical user interface. The graphical user interface is configured to display the view of the dependency graph along with other views of the dependency graph, depending on user input by the number of people.

The process then receives user input from the number of people identifying changes to the dependency graph (step 1218). The process updates the dependency graph (step 1220). Updates to the dependency graph include, for example, adding links to the dependency graph, adding nodes to the dependency graph, changing the position of links in the dependency graph, updating the attributes for the selected component and associated dependencies, and/or other suitable updates. Changes to the dependency graph may also include a person making changes to the changes proposed by another person, validating the changes proposed by another person, and/or suggesting additional changes in addition to the changes proposed by another person.

The process then updates the confidence levels for the number of people in the associated people cloud (step 1222).

A confidence level for a person may increase when the information provided by a person is validated by one or more other people. A confidence level for a person may decrease when the information provided by the person is invalidated by one or more other people. The process determines whether there are any components in the network data processing system that have not been processed (step 1224). If components that have not been processed are present, the process returns to step 1212. Otherwise, the process terminates.

Figure 13:
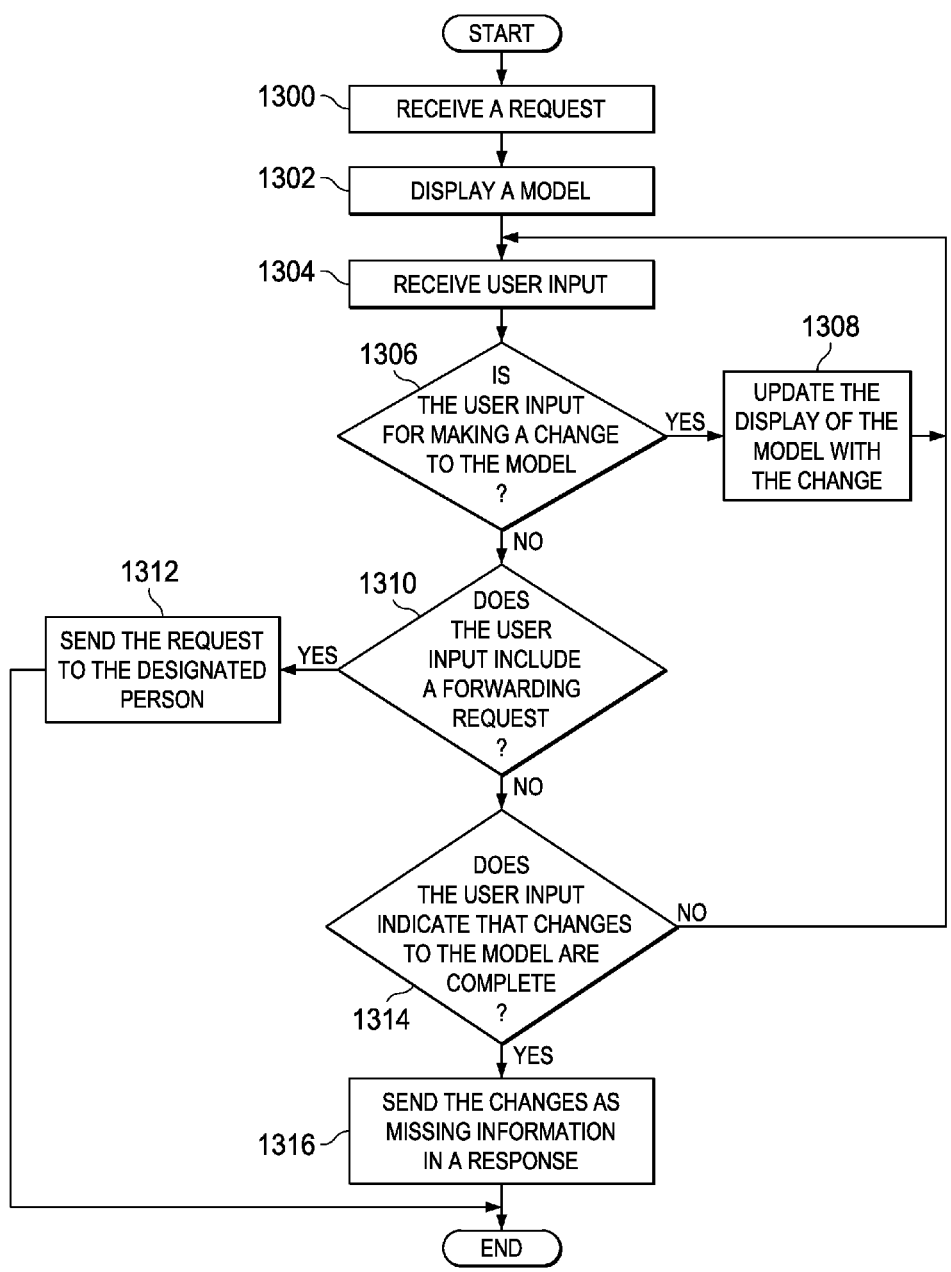
FIG. 13 is an illustration of a flowchart of a process for processing a request for missing information in accordance with an illustrative embodiment.

With reference now to FIG. 13, an illustration of a flowchart of a process for processing a request for missing information is depicted in accordance with an illustrative embodiment. The process illustrated in FIG. 13 may be implemented in network data processing system 100 in FIG. 1 and/or network data processing system 302 in FIG. 3.

The process begins by receiving a request (step 1300). The request is a request within number of requests 346 in FIG. 3. The request may be received at a data processing system used by a person. This person is an expert for at least one of the components in a network data processing system in this illustrative example. The process displays a model (step 1302). The model is a view of a model of the network data processing system. The model may be a complete view of the network data processing system or a partial view. The model is displayed on a graphical user interface associated with the data processing system.

The process then receives user input (step 1304). The user input is input by the person using the graphical user interface. The process determines whether the user input is for making a change to the model (step 1306). If the user input is for making a change to the model, the process updates the display of the model with the change (step 1308). The process then returns to step 1304 as described above.

With reference again to step 1306, if the user input is not for making a change to the model, the process determines whether the user input includes a forwarding request (step 1310). A forwarding request is a request to forward the request received in step 1300 to another person. This person is also an expert for at least one of the components in the network data processing system. The user input may designate an expert to whom to send the request received in step 1300. If the user input includes a forwarding request, the process then sends the request to the designated person (step 1312), with the process terminating thereafter.

Otherwise, if the user input does not include a forwarding request, the process determines whether the user input indicates that changes to the model are complete (step 1314). If the process determines that the user input does not indicate that changes to the model are complete, the process returns to step 1304 as described above. Otherwise, if the process determines that the user input does indicate that changes to the model are complete, the process sends the changes as missing information in a response (step 1316), with the process terminating thereafter.

Figure 14:
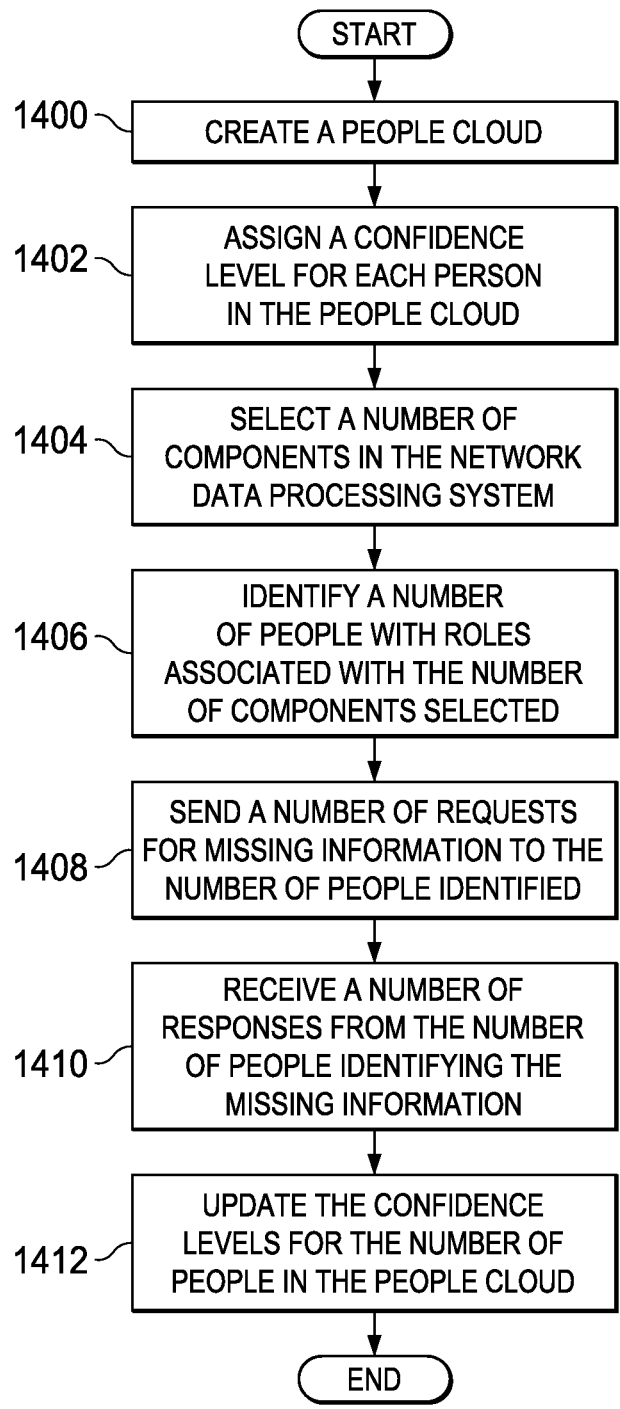
FIG. 14 is an illustration of a flowchart of a process for selecting a number of people from a people cloud in accordance with an illustrative embodiment.

With reference now to FIG. 14, an illustration of a flowchart of a process for selecting a number of people from a people cloud is depicted in accordance with an illustrative embodiment. The process illustrated in FIG. 14 may be implemented in network data processing system 100 in FIG. 1 and/or network data processing system 302 in FIG. 3.

The process begins by creating a people cloud (step 1400). In step 1400, the people cloud is created based on the hardware and/or software components in a network data processing system. For example, the people cloud includes people having roles associated with the hardware and/or software components in the network data processing system. More specifically, the people cloud may include people with roles, such as, for example, the owners of software applications, security owners, network administrators, production controllers, support, and other types of roles. Further, a number of roles may be associated with a particular component.

Thereafter, the process assigns a confidence level for each person in the people cloud (step 1402). The confidence level for a person may be based on a number of factors including, without limitation, the role, experience, skills, duration of time for which the person has the role, and/or other factors. Further, the confidence level of a person determines the quality of information that may be provided by the person.

The process then selects a number of components in the network data processing system (step 1404). The process identifies a number of people with roles associated with the number of components selected (step 1406). In step 1404, this identification may be made by querying a database of experts for the number of components in this illustrative example. In other illustrative examples, the identification may be made by selecting a person with a highest confidence level in a group of people having roles associated with a particular component for each component in the number of components.

Thereafter, the process sends a number of requests for missing information to the number of people identified (step 1408). The process then receives a number of responses from the number of people identifying the missing information (step 1410). The process then updates the confidence levels for the number of people in the people cloud (step 1412), with the process terminating thereafter.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions, acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer usable or computer readable medium providing program code for use by or in connection with a computer or any instruction system. For the purposes of this description, a computer usable or computer readable medium can be any tangible apparatus that can contain, store, communicate, propagate, or transport the program for use by or in connection with the instruction system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual running of the program code, bulk storage, and cache memories, which provide temporary storage of at least some program code in order to reduce the number of times code must be retrieved from bulk storage during running of the code.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, remote printers, or storage devices through intervening networks. Modems, cable modem, and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for analyzing components of a network data processing system, the method comprising:

obtaining, by a computer system, known information about a number of hardware and software components in the network data processing system;

creating, by the computer system, a model of the number of hardware and software components in the network data processing system using the known information about the number of hardware and software components;

identifying, by the computer system, missing information about the number of hardware and software components in the network data processing system based on the model of the number of hardware and software components in the network data processing system;

creating, by the computer system, an associated cloud of people having knowledge of the number of hardware and software components in the network data processing system;

assigning, by the computer system, a confidence level to each person in the associated cloud of people that determines a quality of information provided by each person in the associated cloud of people having knowledge of the number of hardware and software components in the network data processing system based on a role of a person in the associated cloud of people, a relationship of the role to the number of hardware and software components in the network data processing system, how long the relationship existed, a reputation of the person, an ability of the person to perform the role, and an amount of the knowledge possessed by the person regarding the number of hardware and software components, wherein the computer system increases the confidence level associated with the person in the associated cloud of people when information provided by the person is validated by one or more other people, and wherein the computer system decreases the confidence level associated with the person when the information provided by the person is invalidated by the one or more other people, and wherein the computer system uses the associated cloud of people having the knowledge of the number of hardware and software components to identify a number of people having roles associated with the number of hardware and software components in the network data processing system;

selecting, by the computer system, the number of people having the roles associated with the number of hardware and software components in the network data processing system to obtain the identified missing information about the number of hardware and software components in the network data processing system;

sending, by the computer system, a number of requests that includes the model of the number of hardware and software components in the network data processing system to the number of people having the roles associated with the number of hardware and software components in the network data processing system requesting the identified missing information about the number of hardware and software components in the network data processing system; and responsive to receiving, by the computer system, a number of responses that includes the identified missing information about the number of hardware and software components in the network data processing system to the number of requests, updating, by the computer system, the model of the number of hardware and software components in the network data processing system.

2. The method of claim 1 further comprising:

displaying the model of the number of hardware and software components in the network data processing system in a graphical user interface to the number of people having the roles associated with the number of hardware and software components in the network data processing system; and receiving user input to the model of the number of hardware and software components in the network data processing system through the graphical user interface.

3. The method of claim 2, wherein the user input provides at least one of a change to the known information about the number of hardware and software components in the network data processing system and a portion of the identified missing information about the number of hardware and software components in the network data processing system.

4. The method of claim 2, wherein the displaying of the model of the number of hardware and software components in the network data processing system in the graphical user interface to the number of people having the roles associated with the number of hardware and software components in the network data processing system comprises:

displaying gaps graphically within the model of the network data processing system identifying the missing information about the number of hardware and software components in the model of the network data processing system in the graphical user interface to the number of people having the roles associated with the number of hardware and software components in the network data processing system.

5. The method of claim 1, wherein the sending, by the computer system, the number of requests that includes the model of the number of hardware and software components in the network data processing system to the number of people having the roles associated with the number of hardware and software components in the network data processing system requesting the identified missing information about the number of hardware and software components in the network data processing system comprises:

sending a request to a person in the number of people, wherein the request includes an identification of a number of pieces of the missing information about the number of hardware and software components in the network data processing system.

6. The method of claim 1, wherein the selecting, by the computer system, the number of people having the roles associated with the number of hardware and software components in the network data processing system to obtain the identified missing information about the number of hardware and software components in the network data processing system comprises:

querying a database of experts for the number of hardware and software components in the network data processing system using an identification of the missing information about the number of hardware and software components in the network data processing system to identify the number of people having the roles associated with the number of hardware and software components.

7. The method of claim 1, wherein the creating, by the computer system, the model of the number of hardware and software components in the network data processing system comprises:

identifying nodes that represent the number of hardware and software components in the network data processing system and links between the nodes that represent dependencies between the number of hardware and software components from the known information about the number of hardware and software components to form the model of the number of hardware and software components in the network data processing system.

8. The method of claim 1 further comprising:

performing validation on new information about the number of hardware and software components in the network data processing system in the number of responses that includes the identified missing information about the number of hardware and software components in the network data processing system.

9. The method of claim 1, wherein the identifying, by the computer system, the missing information about the number of hardware and software components in the network data processing system based on the model of the number of hardware and software components in the network data processing system comprises:

identifying, by the computer system, the missing information about the number of hardware and software components in the network data processing system in the model of the number of hardware and software components in the network data processing system using a model of roles for the number of people.

10. A data processing system for analyzing components of a network data processing system, the data processing system comprising:

a bus;

a communications unit connected to the bus;

a storage device connected to the bus, wherein the storage device includes program code; and a processor unit connected to the bus, wherein the processor unit runs the program code to obtain known information about a number of hardware and software components in the network data processing system; create a model of the number of hardware and software components in the network data processing system using the known information about the number of hardware and software components; identify missing information about the number of hardware and software components in the network data processing system based on the model of the number of hardware and software components in the network data processing system; create an associated cloud of people having knowledge of the number of hardware and software components in the network data processing system; assign a confidence level to each person in the associated cloud of people that determines a quality of information provided by each person in the associated cloud of people having knowledge of the number of hardware and software components in the network data processing system based on a role of a person in the associated cloud of people, a relationship of the role to the number of hardware and software components in the network data processing system, how long the relationship existed, a reputation of the person, an ability of the person to perform the role, and an amount of the knowledge possessed by the person regarding the number of hardware and software components, wherein the confidence level associated with the person in the associated cloud of people is increased when information provided by the person is validated by one or more other people, and wherein the confidence level associated with the person is decreased when the information provided by the person is invalidated by the one or more other people, and wherein the associated cloud of people having the knowledge of the number of hardware and software components is used to identify a number of people having roles associated with the number of hardware and software components in the network data processing system; select the number of people having the roles associated with the number of hardware and software components in the network data processing system to obtain the identified missing information about the number of hardware and software components in the network data processing system; send a number of requests that includes the model of the number of hardware and software components in the network data processing system to the number of people having the roles associated with the number of hardware and software components in the network data processing system requesting the identified missing information about the number of hardware and software components in the network data processing system; and update the model of the number of hardware and software components in the network data processing system in response to receiving a number of responses that includes the identified missing information about the number of hardware and software components in the network data processing system to the number of requests.

11. The data processing system of claim 10, wherein the processor unit further executes the program code to display the model of the number of hardware and software components in the network data processing system in a graphical user interface to the number of people having the roles associated with the number of hardware and software components in the network data processing system; and receive user input to the model of the number of hardware and software components in the network data processing system through the graphical user interface.

12. The data processing system of claim 11, wherein the user input provides at least one of a change to the known information about the number of hardware and software components in the network data processing system and a portion of the identified missing information about the number of hardware and software components in the network data processing system.

13. The data processing system of claim 11, wherein in running the program code to display the model of the number of hardware and software components in the network data processing system in the graphical user interface to the number of people having the roles associated with the number of hardware and software components in the network data processing system, the processor unit executes the program code to display gaps graphically within the model of the network data processing system identifying the missing information about the number of hardware and software components in the model of the network data processing system in the graphical user interface to the number of people having the roles associated with the number of hardware and software components in the network data processing system.

14. The data processing system of claim 10, wherein in running the program code to send the number of requests that includes the model of the number of hardware and software components in the network data processing system to the number of people having the roles associated with the number of hardware and software components in the network data processing system requesting the identified missing information about the number of hardware and software components in the network data processing system, the processor unit executes the program code to send a request to a person in the number of people, wherein the request includes an identification of a number of pieces of the missing information about the number of hardware and software components in the network data processing system.

15. The data processing system of claim 10, wherein in executing the program code to select the number of people having the roles associated with the number of hardware and software components in the network data processing system to obtain the identified missing information about the number of hardware and software components in the network data processing system, the processor unit executes the program code to query a database of experts for the number of hardware and software components in the network data processing system using an identification of the missing information about the number of hardware and software components in the network data processing system to identify the number of people having the roles associated with the number of hardware and software components.

16. The data processing system of claim 10, wherein in executing the program code to create the model of the number of hardware and software components in the network data processing system, the processor unit executes the program code to identify nodes that represent the number of hardware and software components in the network data processing system and links between the nodes that represent dependencies between the number of hardware and software components from the known information about the number of hardware and software components to form the model of the number of hardware and software components in the network data processing system.

17. The data processing system of claim 10, wherein the processor unit further executes the program code to perform validation on new information about the number of hardware and software components in the network data processing system in the number of responses that includes the identified missing information about the number of hardware and software components in the network data processing system.

18. The data processing system of claim 10, wherein in executing the program code to identify the missing information about the number of hardware and software components in the network data processing system based on the model of the number of hardware and software components in the network data processing system, the processor unit executes the program code to identify the missing information about the number of hardware and software components in the network data processing system in the model of the number of hardware and software components in the network data processing system using a model of roles for the number of people.

19. A computer program product for analyzing components of a network data processing system, the computer program product comprising:
   a computer recordable storage medium;
   program code, stored on the computer recordable storage medium, for obtaining known information about a number of hardware and software components in the network data processing system;
   program code, stored on the computer recordable storage medium, for creating a model of the number of hardware and software components in the network data processing system using the known information about the number of hardware and software components;
   program code, stored on the computer recordable storage medium, for identifying missing information about the number of hardware and software components in the network data processing system based on the model of the number of hardware and software components in the network data processing system;
   program code, stored on the computer recordable storage medium, for creating an associated cloud of people having knowledge of the number of hardware and software components in the network data processing system;
   program code, stored on the computer recordable storage medium, for assigning a confidence level to each person in the associated cloud of people that determines a quality of information provided by each person in the associated cloud of people having knowledge of the number of hardware and software components in the network data processing system based on a role of a person in the associated cloud of people, a relationship of the role to the number of hardware and software components in the network data processing system, how long the relationship existed, a reputation of the person, an ability of the person to perform the role, and an amount of the knowledge possessed by the person regarding the number of hardware and software components, wherein the confidence level associated with the person in the associated cloud of people is increased when information provided by the person is validated by one or more other people, and wherein the confidence level associated with the person is decreased when the information provided by the person is invalidated by the one or more other people, and wherein the associated cloud of people having the knowledge of the number of hardware and software components is used to identify a number of people having roles associated with the number of hardware and software components in the network data processing system;

program code, stored on the computer recordable storage medium, for selecting the number of people having the roles associated with the number of hardware and software components in the network data processing system to obtain the identified missing information about the number of hardware and software components in the network data processing system;

program code, stored on the computer recordable storage medium, for sending a number of requests that includes the model of the number of hardware and software components in the network data processing system to the number of people having the roles associated with the number of hardware and software components in the network data processing system requesting the identified missing information about the number of hardware and software components in the network data processing system; and program code, stored on the computer recordable storage medium, for updating the model of the number of hardware and software components in the network data processing system in response to receiving a number of responses that includes the identified missing information about the number of hardware and software components in the network data processing system to the number of requests.

20. The computer program product of claim 19 further comprising:

program code, stored on the computer recordable storage medium, for displaying the model of the number of hardware and software components in the network data processing system in a graphical user interface to the number of people having the roles associated with the number of hardware and software components in the network data processing system; and program code, stored on the computer recordable storage medium, for receiving user input to the model of the number of hardware and software components in the network data processing system through the graphical user interface.

21. The computer program product of claim 20, wherein the user input provides at least one of a change to the known information about the number of hardware and software components in the network data processing system and a portion of the identified missing information about the number of hardware and software components in the network data processing system.

22. The computer program product of claim 20, wherein the program code, stored on the computer recordable storage medium, for displaying the model of the number of hardware and software components in the network data processing system in the graphical user interface to the number of people having the roles associated with the number of hardware and software components in the network data processing system comprises:

program code, stored on the computer recordable storage medium, for displaying gaps graphically within the model of the network data processing system identifying the missing information about the number of hardware and software components in the model of the network data processing system in the graphical user interface to the number of people having the roles associated with the number of hardware and software components in the network data processing system.

23. The computer program product of claim 19, wherein the program code, stored on the computer recordable storage medium, for sending the number of requests that includes the model of the number of hardware and software components in the network data processing system to the number of people having the roles associated with the number of hardware and software components in the network data processing system requesting the identified missing information about the number of hardware and software components in the network data processing system comprises:

program code, stored on the computer recordable storage medium, for sending a request to a person in the number of people, wherein the request includes an identification of a number of pieces of the missing information about the number of hardware and software components in the network data processing system.

* * * * *